Patented Mar. 26, 1940

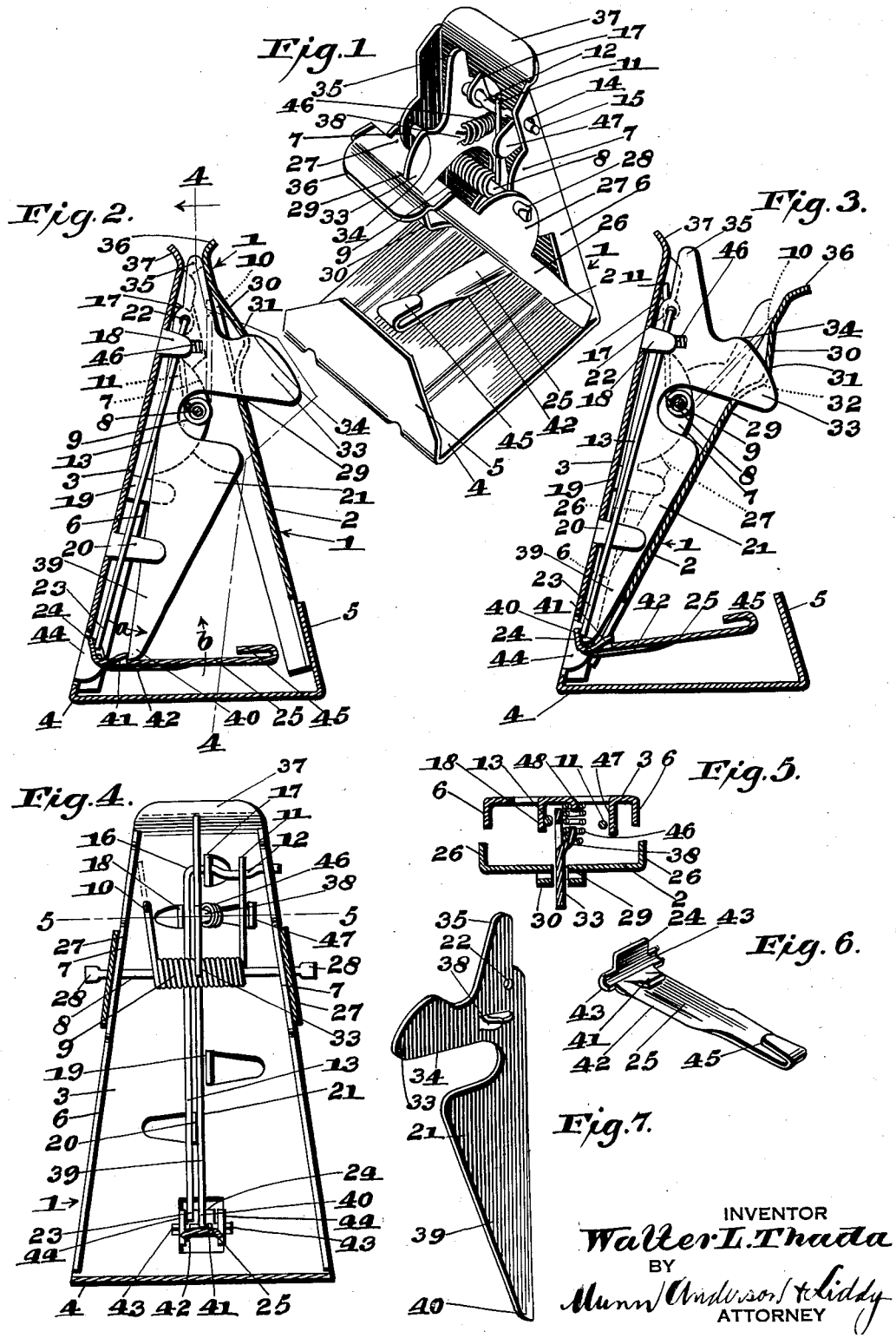

2,194,838

UNITED STATES PATENT OFFICE 2,194,838

ANIMAL TRAP

Walter L. Thada, Klemme, Iowa

Application November 21, 1938, Serial No. 241,695

12 Claims. (Cl. 43—83)

This invention relates to improvements in animal traps, particularly of the type intended for catching mice. One of the characteristics of the trap is its structural arrangement, whereby it may be stood on the floor close to the corner where the wall rises, so as to put the trigger mechanism directly in line with the path which the mouse instinctively travels. In other words, the trap forms part of the runway of the mouse. In this respect attention is directed to the patent to Walter L. Thada, for Animal traps, No. 1,922,265, Aug. 17, 1933.

The instant trap constitutes an improvement of the patented trap in several important respects. These improvements make the trap even better adapted to the function of comprising part of the runway of mice, attention being directed to the following objects of the invention:

First, to provide an animal trap which forms a closed runway, a particular improvement being in the manner of holding the movable side or jaw in position when the trap is set.

Second, to provide a trap of roughly pyramidal form, adapted to constitute part of an animal runway, wherein the same positive finger pressure which sets the movable jaw also sets the trigger to secure the movable jaw.

Third, to support the trigger in such a manner that it has a floating relationship to the trip when the trap is in the set position, thereby making the trip and consequently the trap subject to being sprung by the lightest touch.

Other objects and advantages will appear in the following specification, reference being had to the accompanying drawing, in which:

Figure 1 is a perspective view of the trap showing the parts in the sprung position.

Figure 2 is a central vertical section of the trap showing it in the set position.

Figure 3 is a similar view of the trap again showing it in the sprung position.

Figure 4 is a vertical section taken substantially on the line 4—4 of Fig. 2.

Figure 5 is a cross section taken on the line 5—5 of Fig. 4.

Figure 6 is a detail perspective view of the bait plate or trip.

Figure 7 is a detail perspective view of the trigger.

In carrying out the invention provision is made of a body generally designated 1, which comprises a movable side wall or jaw 2, a companion stationary wall or jaw 3, a base 4 and a guard wall 5. These and most of the other parts of the trap are stamped out of a sheet metal of a suitable gauge, bent and assembled in such form that the trap 1 roughly assumes the shape of a pyramid.

Flanges 6 are bent inwardly of the stationary wall or jaw 3, and are provided with enlargements 7 (Fig. 1) which constitute partial supports for a cross pin 8. This cross pin provides a convenient mount for the coils of a main spring 9 which is for the purpose of closing the trap when sprung. The free ends 10, 11 of the main spring respectively exert pressure in the directions of the jaws 2 and 3. The end 10 is in direct contact with the jaw 2 (Figs. 2 and 3), but the end 11 is intercepted by the offset 12 of a tension arm 13.

One of the flanges 6 of the jaw 3 has an opening 14 in which one extremity 15 of the tension arm 13 rests. This arm is in the shape of an inverted L (Fig. 4) offset 12 occurring in the shortest portion thereof. Said portion has bearing adjacent to its bend 16 in a tab 17 bent in from the jaw 3. Said jaw has other and similar tabs 18, 19 and 20 bent in therefrom, particularly to provide guides for the tension arm 13 and for the trigger generally designated 21.

This trigger is pivoted at 22 upon the horizontal short portion of the tension arm 13 (Fig. 4). The latter thus constitutes the pivotal mount for the trigger in addition to serving its purpose as a tension arm. The tension in said arm is derived from the pressure which the spring end 11 exerts against the offset 12. This offset is in the nature of a minute crank. The previously mentioned short portion of the arm is journaled in the illustrated openings in the flange 6 and tab 17, and the slight degree of turning to which it is susceptible because of the spring pressure against the offset 12 is transmitted to the bottom extremity 23 of said arm whence it is applied to the heel 24 of the bait plate or trip 25 (Fig. 6).

Reverting to the movable jaw 2 it is seen in Fig. 1 that this has flanges 26 and enlargements 27 matching the flanges 6 and 7 of the jaw 3. The enlargements are secured together by the cross pin 8, whereupon the ends of the cross pin are pinched or flattened at 28 (Fig. 4) so as to prevent the withdrawal of the cross pin. The movable jaw 2 is slotted at 29. This slot is carried upwardly into a bridge 30. This bridge is struck out from the jaw 2 and the place 31 where the top of the slot terminates either at or adjacent to the crest 32 of the bridge constitutes a detent for the trigger 21. The latter comprises a shoulder 33 which includes a boss 34 in its formation. From there on the trigger merges into a finger 35 which occupies a position between the outwardly bent finger holds 36, 37 of the jaws 2, 3. At a place adjacent to the pivot hole 22 (Fig. 7) the trigger 21 has a tab 38 struck up therefrom. This tab is bent to stand in spaced relationship to the trigger. The latter has a relatively long depending portion 39 which terminates, virtually, in a point 40.

This point is adapted to be engaged with a detent 41 which is struck up from the trip 25 (Fig. 6). The latter is bent down at 42 along its sides so as to make the trip fairly rigid. These bent portions merge into arcuate pintles 43 which occur at the bend between the heel 24 and the plate portion of the trip. These pintles are seated in round holes in a pair of tabs 44 (Fig. 4) which, like all other tabs on the jaw 3, are struck from and bent forwardly of the metal. The free end of the trip 25 is bent upon itself at 45 to provide a recess for the bait.

A light spring 46 (Fig. 1) is seated upon the tab 38 (Fig. 7) at one of its ends. This spring bears against the stationary jaw 3, (Fig. 5). A tab 47 is bent up from the jaw 3 adjacent to this spring, partly for the purpose of acting as a retainer for the spring end 11. The tab 47 prevents the end 11 from slipping away from the offset 12. In making the tab 47 the punching is done in such a manner as to provide for a small lug 48 at that side of the opening opposite to that from which the tab 47 is bent. The lug 48 thus constitutes the seat for the other end of the spring 46.

The operation of the trap is readily understood. The pressure of the spring end 11 against the offset 12 turns the tension arm 13 backward toward the stationary jaw 3 so that the extremity 23 of the arm always engages the heel 24 and tends to always elevate the trip 25 (Fig. 3). In desiring to set the trap the finger holds 36, 37 are pressed toward each other. The finger hold 36 will engage the finger 35 and swing the trigger 21 slightly on its pivot 22 (arrow a, Fig. 2).

In this act the point 40 will override the detent 41. Since the pressure of the tension arm 13 always tends to turn the trip 25 upward (arrow b, Fig. 2) it follows that the detent 41 will engage behind the point 40 as soon as the latter has passed to the front. Simultaneously with this act the detent 31 makes engagement with the boss 34. It is this engagement which holds the movable jaw 2 in the set position.

The tension of the light spring 46 is forward. Since this spring is situated beneath the pivot point 22 it follows that this spring tends to urge the trigger 21 in the direction of arrow a (Fig. 2). The spring 46 serves two purposes. First, in setting the trap it helps to push the trigger 21 in the direction of arrow a (Fig. 2), second, to tend to hold the trigger 21 out from the jaw 3 so that the pressure between the point 40 and the detent 41 will not be too great.

Although the trigger 21 is suspended at the pivotal point 22 yet the action of the spring 46 upon it makes the trigger float, in a sense. The underlying purpose of the arrangement is to sustain the point 40 of the trigger lightly, yet firmly, against the detent 41 so that the lightest touch upon the trip 25 will cause the springing of the trap.

Springing is accomplished by the lightest downward pressure on the trip 25. The resulting displacement of the detent 41 from the trigger point 40 leaves the point 40 free to be swung backward into the position in Fig. 3. This swinging is produced by the pressure of the detent 31 against the boss 34. As long as the point 40 is held forwardly by the detent 41 the boss 34 will offer an obstruction to the detent 31. But when the detent 41 is displaced as stated, then the detent 31 will override the boss 34, and in doing so will swing the trigger 21 to the position in Fig. 3. The jaw 2 snaps to the closed position simultaneously with this act.

I claim:

1. A trap comprising a base having a fixed jaw, a movable jaw and means by which it is pivoted to the fixed jaw, said jaws being in upstanding relationship to the base but sloping together upwardly to form a closed animal runway and to define a constriction at the top, a trigger mechanism within the confines of the runway for holding the movable jaw open, and a finger constituting part of the trigger mechanism, occupying the constriction and being operable by pressing the jaws together at said constriction to set said mechanism and the movable jaw.

2. A trap comprising a base having a fixed jaw, a movable jaw and means by which it is pivoted to the fixed jaw, said jaws being in upstanding relationship to the base but sloping together upwardly to form a closed animal runway and to define a constriction at the top, a trigger mechanism within the confines of the runway for holding the movable jaw open, said mechanism comprising a trigger and detent means mutually embodied in the trigger and movable jaw for securing said jaw in the set position, a trip pivotally attached to the fixed jaw, and detent means mutually embodied in the trigger and said trip for securing the trigger in its set position, and a finger projecting from the trigger, occupying the constriction and being operable by pressing the jaws together at said constriction to maneuver the trigger into a position of simultaneous engagement of both mutual detent means.

3. A trap comprising a pair of movably connected jaws, trigger mechanism carried by one of the jaws, said mechanism including a trigger and a trip for setting the trigger, detent means mutually embodied in the trigger and the other jaw to hold the jaws separated, and resilient means putting one of the jaws under closing tension and at the same time acting on the trigger mechanism to support the trip in position to hold the trigger set.

4. A trap comprising a pair of movably connected jaws, trigger mechanism carried by one of the jaws, said mechanism including a trigger and a trip for setting the trigger, detent means mutually embodied in the trigger and the other jaw to hold the jaws separated, resilient means putting one of the jaws under closing tension, and a tension arm actuated by said resilient means to maintain the trip in position to hold the trigger set.

5. A trap comprising a pair of movably connected jaws, trigger mechanism carried by one of the jaws, said mechanism including a trigger and a trip for setting the trigger, detent means mutually embodied in the trigger and the other jaw to hold the jaws separated, resilient means putting one of the jaws under closing tension and having a free end, and a tension arm having an offset at one of its extremities to take the pressure of said resilient means through contact of its free end therewith, the other extremity of said arm engaging the trip to maintain said trip in position to hold the trigger set.

6. A trap comprising a pair of movably connected jaws, trigger mechanism carried by one of the jaws, said mechanism including a trigger and a trip for setting the trigger, detent means mutually embodied in the trigger and the other jaw to hold the jaws separated, resilient means putting one of the jaws under closing tension and having a free end, and a tension arm in engagement with the trip at one of its extremities, being angled at its other extremity and pivotally mounted on one of the jaws, said angled extremity having an offset constantly engaged by the free end of the resilient means to tend to maintain the trip in position to hold the trigger set.

7. A trap comprising a pair of movably connected jaws, trigger mechanism carried by one of the jaws, said mechanism including a trigger and a trip for setting the trigger, detent means mutually embodied in the trigger and the other jaw to hold the jaws separated, resilient means putting one of the jaws under closing tension, a tension arm actuated by said resilient means to maintain the trip in position to hold the trigger set, and means exercising pressure on the trigger to hold said trigger in floating relationship to the trip thereby easing the displacement of the trip from the trigger.

8. A trap comprising a pair of movably connected jaws, trigger mechanism carried by one of the jaws, said mechanism including a trigger which has a point, a trip also included in said mechanism, having a detent engageable by said point to hold the trigger in the set position, detent means mutually embodied in the trigger and the other jaw to hold the jaws separated, resilient means putting one of the jaws under closing tension and including a free end, a tension arm pivotally carried by one of the jaws, having one of its extremities in engagement with the trip and being angled at its other extremity, said angled extremity having an offset providing a crank which is engageable by the free end of the resilient means to tension the trip so as to hold the trip detent up against the trigger point, and a spring acting between the trigger and one of the jaws, tending to float the trigger point away from the trip detent, thus to lessen the displacing effort of the trip from the trigger.

9. A trap comprising a pair of movably connected jaws, resilient means putting one of the jaws under closing tension, and trigger mechanism adapted to resist said closing tension, said mechanism including a trigger having a boss and a detent on the movable jaw obstructed by the boss when said jaw is held open by the trigger mechanism.

10. A trap comprising a pair of movably connected jaws, resilient means putting one of the jaws under closing tension, said jaw having a bridge with a detent, a trigger pivotally carried by the other jaw, having a boss in obstructing relationship to the detent, said trigger being adapted to be swung on its pivot by the transfer of the closing tension through the detent to the boss, and a trip pivotally carried by said other jaw having a detent in position in the path of swinging of said trigger.

11. In a trap, a trigger having a pivot support, an upstanding finger adjacent to said support, a shoulder projecting from the trigger and having a boss, and a relatively long depending portion terminating in a detent point, said trigger having means providing a spring mount.

12. In a trap, a trip comprising an angled member, the angled portions of which provide a bait plate and a heel, half round trunnions embodied in the bend between the heel and bait plate, and a detent struck up from the bait plate.

WALTER L. THADA.